«12» United States Patent
Anderson et al.

(10) Patent No.: US 7,240,277 B2
(45) Date of Patent: Jul. 3, 2007

(54) MEMORY ERROR DETECTION REPORTING

(75) Inventors: Timothy D. Anderson, Dallas, TX (US); David Q. Bell, Houston, TX (US); Abhijeet A. Chachad, Plano, TX (US); Peter Dent, Irthlingborough (GB); Raguram Damodaran, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 517 days.

(21) Appl. No.: 10/950,797

(22) Filed: Sep. 27, 2004

(65) Prior Publication Data

US 2005/0132263 A1 Jun. 16, 2005

Related U.S. Application Data

(60) Provisional application No. 60/506,384, filed on Sep. 26, 2003.

(51) Int. Cl.
*G06F 11/10* (2006.01)
*G06F 12/04* (2006.01)

(52) U.S. Cl. ........................... 714/805; 711/144
(58) Field of Classification Search ............... 714/805; 711/144
See application file for complete search history.

(56) References Cited

U.S. PATENT DOCUMENTS

| | | | | | |
|---|---|---|---|---|---|
| 4,357,656 | A | * | 11/1982 | Saltz et al. | 711/138 |
| 4,426,682 | A | * | 1/1984 | Riffe et al. | 711/135 |
| 4,434,459 | A | * | 2/1984 | Holland et al. | 712/210 |
| 4,493,026 | A | * | 1/1985 | Olnowich | 711/128 |
| 5,210,845 | A | * | 5/1993 | Crawford et al. | 711/128 |
| 5,327,570 | A | * | 7/1994 | Foster et al. | 712/30 |
| 5,530,823 | A | * | 6/1996 | Tsuchiya et al. | 711/207 |
| 5,581,729 | A | * | 12/1996 | Nishtala et al. | 711/144 |
| 5,617,347 | A | * | 4/1997 | Lauritzen | 365/49 |
| 5,825,682 | A | * | 10/1998 | Fukui | 365/49 |
| 5,832,250 | A | * | 11/1998 | Whittaker | 711/144 |

\* cited by examiner

*Primary Examiner*—Stephen M. Baker
(74) *Attorney, Agent, or Firm*—Robert D. Marshall, Jr.; W. James Brady; Frederick J. Telecky, Jr.

(57) ABSTRACT

A memory system or a digital signal processor (DSP) includes single-bit-error detection hardware in its level two (L2) memory controller to mitigate the effects of soft errors. Error detection hardware detects erroneous data that is fetched by the central processing unit and signals the central processing unit. The parity is generated and checked only for whole memory line accesses. This technique is especially useful for cache memory. The central processing unit can query the memory controller as to the specific location that generated the error and decide the next course of action based on the type of data affected.

16 Claims, 6 Drawing Sheets

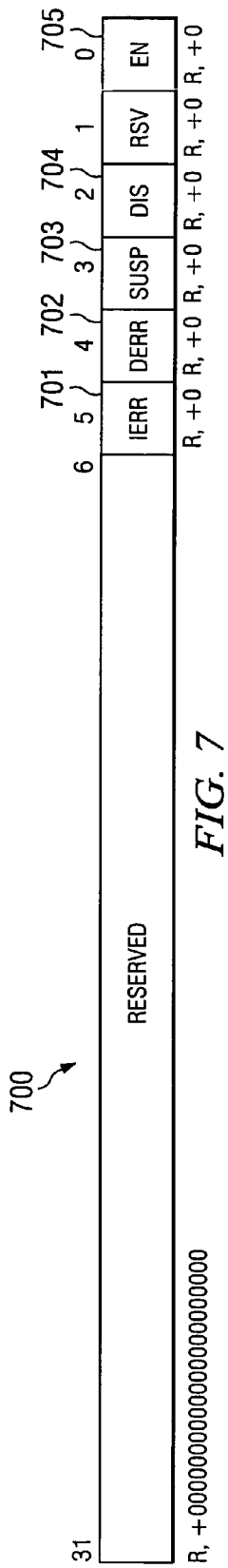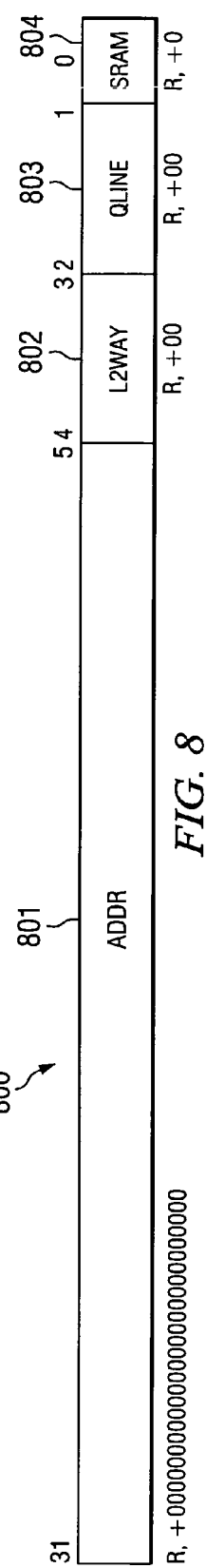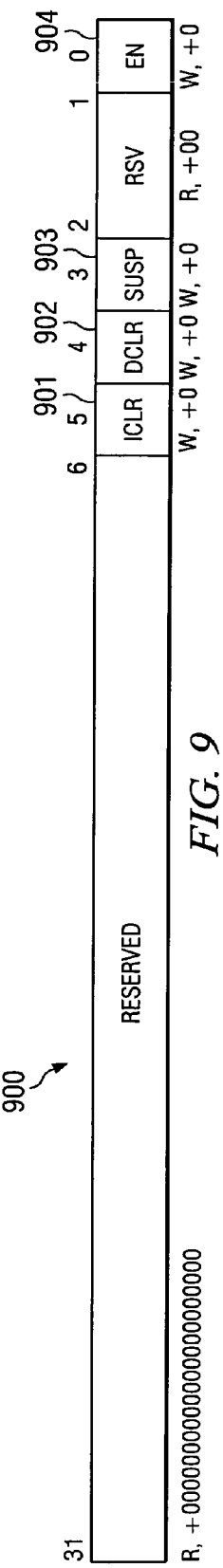

MEMORY ERROR DETECTION REPORTING

CLAIM OF PRIORITY UNDER 35 U.S.C. §119(e) (1)

This application claims priority under 35 U.S.C. §119(e) (1) from U.S. Provisional Application Ser. No. 60/506,384 filed Sep. 26, 2003.

TECHNICAL FIELD OF THE INVENTION

The technical field of this invention is error detection in digital signal processing memory.

BACKGROUND OF THE INVENTION

The occurrence of soft errors in memory is a major reason for failure of digital signal processor applications. These soft errors occur due to random radiation flipping a bit within the memory. It is known in the art to store one or more parity bits along with data to detect such errors. Such prior art systems often do not detect and report enough data for an intelligent decision on error response.

SUMMARY OF THE INVENTION

The digital signal processor (DSP) of this invention includes single-bit-error detection hardware in its level two (L2) memory controller to mitigate the effects of soft errors that may occur during device operation. The error detection hardware catches erroneous data that is fetched by the central processing unit and signals to the central processing unit that an error has occurred. The central processing unit can query the memory controller as to the specific location that generated the error and decide the next course of action based on the type of data affected.

The error detection and reporting hardware is a key enabler to reduce the effects of soft errors in a digital signal processor (DSP) system, particularly infrastructure systems where large numbers of digital signal processors and large amounts of memory are present.

The error detection hardware is designed to do the following. Set a parity bit as data is written to L2 memory. Detect single bit errors as data is fetched from L2 to the central processing unit via level one program (L1P) or level one data (L1D) caches. Capture the error location in control registers. Signal an exception to the central processing unit. The implementation provides the system with a means to greatly reduce the potential of a system failure due to soft errors.

BRIEF DESCRIPTION OF THE DRAWINGS

These and other aspects of this invention are illustrated in the drawings, in which:

FIG. 7 illustrates the coding of L2 Error Detection Status register of this invention;

FIG. 8 illustrates the coding of L2 Error Detection Address register of this invention;

FIG. 9 illustrates the coding of the L2 Error Detection Command register of this invention;

DETAILED DESCRIPTION OF PREFERRED EMBODIMENTS

Figure 1:
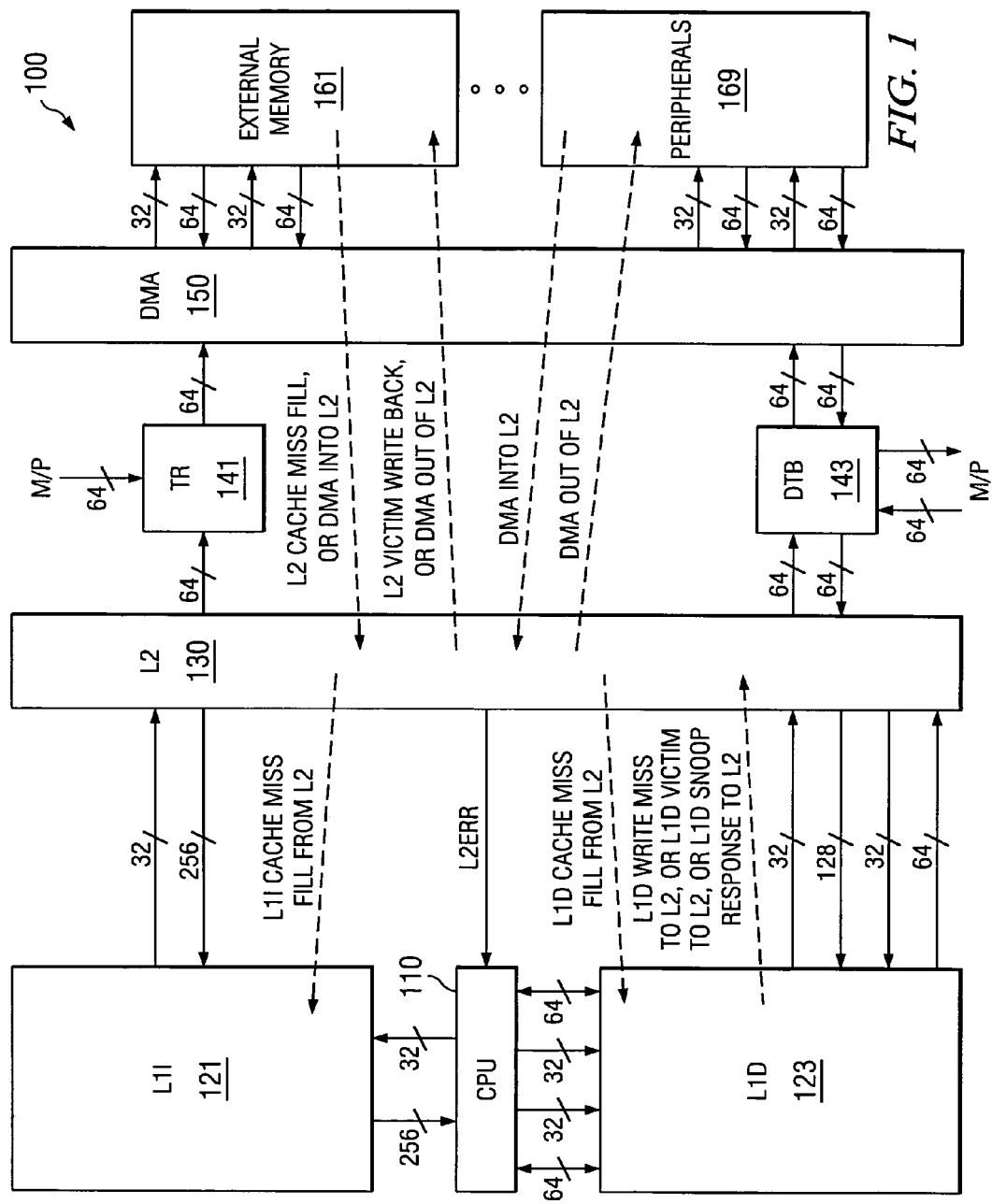
FIG. 1 illustrates the organization of a typical digital signal processor to which this invention is applicable.

FIG. 1 illustrates the organization of a typical digital signal processor system 100 to which this invention is applicable. Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIG. 2.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level One instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

In accordance with the preferred embodiment of this invention, level two unified cache 130 may be configured to include variable amounts of static random access memory (SRAM) instead of cache memory. This aspect of the digital signal processor system is further detailed in U.S. Pat. No. 6,608,686 entitled UNIFIED MEMORY SYSTEM ARCHITECTURE INCLUDING CACHE AND ADDRESSABLE STATIC RANDOM ACCESS MEMORY. In accordance with the invention described in this patent some or all of level two unified cache 130 may be configured as normal read/write memory which operates under program control. If some of level two unified cache 130 is configured as SRAM, then this memory space may be either a source or a destination of a direct memory access. This will be more fully described below.

The complex interrelation of parts of digital signal processor system 100 permits numerous data movements. These are illustrated schematically in FIG. 1 and will be listed here. First, level one instruction cache 121 may receive instructions recalled from level two unified cache 130 (1) for a cache miss fill. In this example, there is no hardware support for self-modifying code so that instructions stored in level one instruction cache 121 are not altered. There are two possible data movements between level one data cache 123 and level two unified cache 130. The first of these data movements is a cache miss fill from level two unified cache 130 to level one data cache 123 (2). Data may also pass from level one data cache 123 to level two unified cache 130 (3). This data movement takes place upon; a write miss to level one data cache 123 which must be serviced by level two unified cache 130; a victim eviction from level one data cache 123 to level two unified cache 130; and a snoop response from level one data cache 123 to level two unified cache 130. Data can be moved between level two unified cache 130 and external memory 160. This can take place upon: a cache miss to level two unified cache 130 service from external memory (4) or a direct memory access 150 data movement from external memory 161 and level two unified cache 130 configured as SRAM; a victim eviction from level two unified cache 130 to external memory 161 (5) or a direct memory access 150 data movement from a portion of level two unified cache 130 configured as SRAM to external memory 161. Finally, data can move between level two unified cache 130 and peripherals 169. These movements take place upon: or a direct memory access 150 data movement from peripheral 169 and level two unified cache 130 configured as SRAM; or a direct memory access 150 data movement from a portion of level two unified cache 130 configured as SRAM to peripherals 169. All data movement between level two unified cache 130 and external memory 161 and between level two unified cache 130 and peripherals 169 employ data transfer bus 143 and are controlled by direct memory access unit 150. These direct memory access data movements may take place as result of a command from central processing unit core 110 or a command from another digital signal processor system received via transfer request bus 141.

The number and variety of possible data movements within digital signal processor system 100 makes the problem of maintaining coherence difficult. In any cache system data coherence is a problem. The cache system must control data accesses so that each returns the most recent data. As an example, in a single level cache a read following a write to the same memory address maintained within the cache must return the newly written data. This coherence must be maintained regardless of the processes within the cache. This coherence preserves the transparency of the cache system. That is, the programmer need not be concerned about the data movements within the cache and can program without regard to the presence or absence of the cache system. This transparency feature is important if the data processor is to properly execute programs written for members of a data processor family having no cache or varying amounts of cache. The cache hardware must maintain the programmer illusion of a single memory space. An example of an ordering hazard is a read from a cache line just victimized and being evicted from the cache. Another example in a non-write allocate cache is a read from a cache line following a write miss to that address with the newly written data in a write buffer waiting write to main memory. The cache system must include hardware to detect and handle such special cases.

A cache system including a second level cache, such as that described above in conjunction with FIG. 1, introduces additional hazards. Coherence must be maintained between the levels of cache no matter where the most recently written data is located. Generally level one caches accessing data will have the most recent data while the level two cache may have old data. If an access is made to the level two cache the cache system must determine if a more recent copy of the data is stored in a level one cache. This generally triggers a snoop cycle in which the level two cache polls the level one cache for more recent data before responding to the access. A snoop is nearly like a Formal access to the snooped cache except that snoops are generally given higher priority. Snoops are granted higher priority because another level cache is stalled waiting on the response to the snoop. If the data stored in the lower level cache has been modified since the last write to the higher level cache, then this data is supplied to the higher level cache. This is referred to as a snoop hit. If the data stored in the lower level cache is clean and thus not been changed since the last write to the higher level cache, then his is noted in the snoop response but no data moves. In this case the higher level cache stores a valid copy of the data and can supply this data.

Additional hazards with a two level cache include snoops to a lower level cache where the corresponding data is a victim being evicted, snoops to data in during a write miss in the lower level cache for non-write allocation systems which places the data in a write buffer. Level two unified cache 130 may need to evict a cache entry which is also cached within level one instruction cache 121 or level one data cache 123. A snoop cycle is required to ensure the latest data is written out to the external main memory. A write snoop cycle is transmitted to both level one instruction cache 121 and level one data cache 123. This write snoop cycle misses if this data is not cached within the level one caches. Level one data cache 123 reports the snoop miss to level two unified cache 130. No cache states within level one data cache 123 are changed. Upon receipt of the snoop miss report, level two unified cache 130 knows that it holds the only copy of the data and operates accordingly. If the snoop cycle hits a cache entry within level one data cache 123, the response differs depending on the cache state of the corresponding cache entry. If the cache entry is not in a modified state, then level two unified cache 130 has a current copy of the data and can operate accordingly. The cache entry is invalidated within level one data cache 123. It is impractical to maintain cache coherency if level one data cache 123 caches the data and level two unified cache 130 does not. Thus the copy of the data evicted from level two unified cache 130 is no longer cached within level one data cache 123. If the cache entry in level one data cache 123 is in the modified state 303 and thus had been modified within that cache, then the snoop response includes a copy of the data. Level two unified cache 130 must merge the data modified in level one data cache 123 with data cached within it before eviction to external memory. The cache entry within level one data cache 123 is invalidated.

In a similar fashion snoop cycles are sent to level one instruction cache 121. Since the digital signal processing system 100 cannot modify instructions within level one instruction cache 121, no snoop return is needed. Upon a snoop miss nothing changes within level one instruction cache 121. If there is a snoop hit within level one instruction cache 121, then the corresponding cache entry is invalidated.

A later attempt to fetch the instructions at that address will generate a cache miss within level one instruction cache 121. This cache miss will be serviced from level two unified cache 130.

Figure 2:
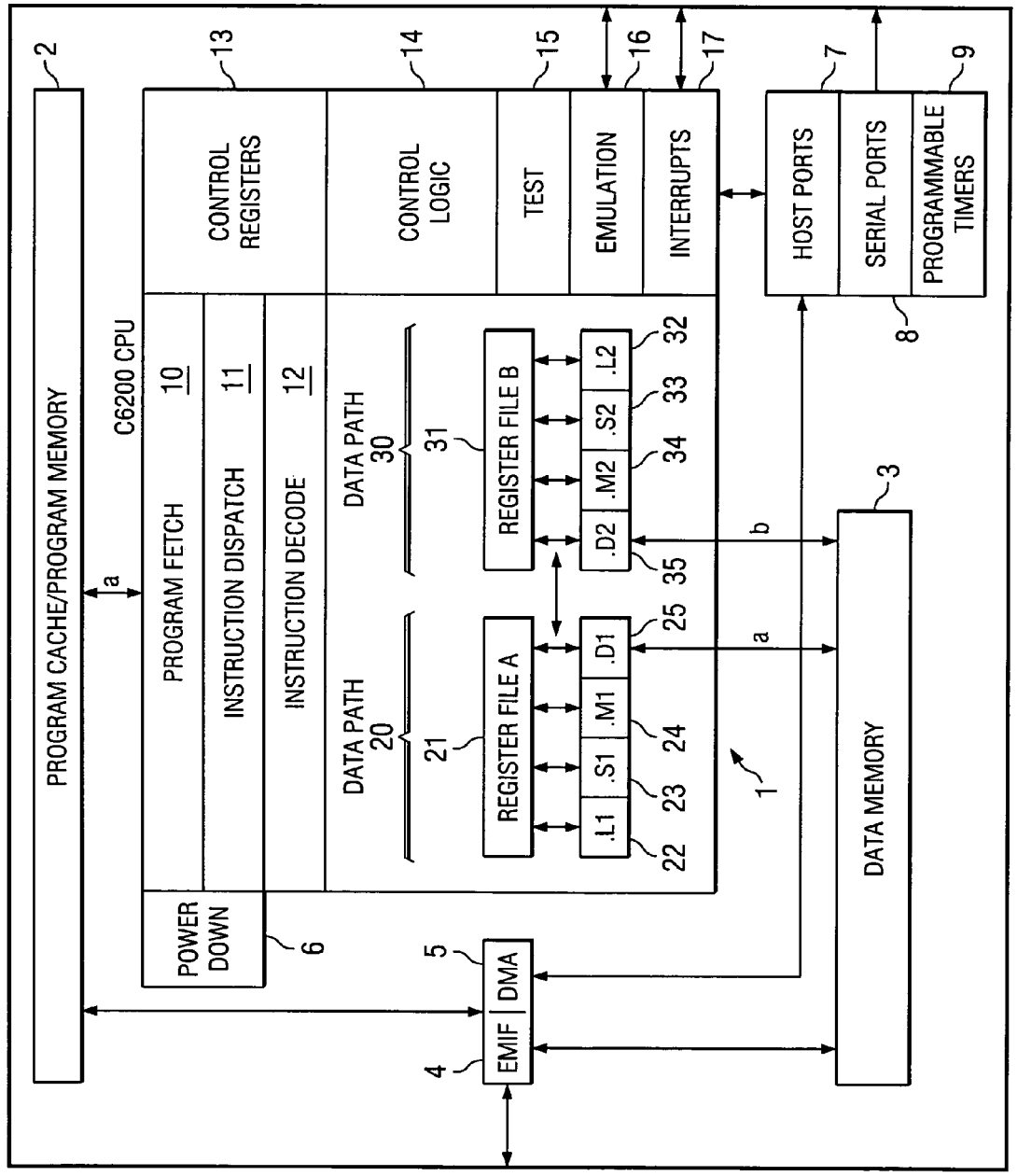
FIG. 2 illustrates details of a very long instruction word digital signal processor core suitable for use in FIG. 1.

FIG. 2 is a block diagram illustrating details of a digital signal processor core suitable for this invention. The digital signal processor core of FIG. 2 is a 32-bit eight-way VLIW pipelined processor. The digital signal processor includes central processing unit 1, shown in the right center portion of FIG. 1. The digital signal processor includes program memory 2 which may optionally be used as a program cache. The digital signal processor may also have varying sizes and types of data memory 3. The digital signal processor also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

The digital signal processor core has a 32-bit, byte addressable address space. Internal memory on the same integrated circuit is preferably organized in a data space including data memory 3 and a program space including program memory 2. When off-chip memory is used, preferably these two spaces are unified into a single memory space via the external memory interface (EMIF) 4.

Data memory 3 may be internally accessed by central processing unit 1 via two internal ports 3a and 3b. Each internal port 3a and 3b preferably has 32 bits of data and a 32-bit byte address reach. Program memory 2 may be internally accessed by central processing unit 1 via a single port 2a. Port 2a of program memory 2 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit registers forming register file A 21. Second data path 30 likewise includes four functional units designated L2 unit 32, S2 unit 33, M2 unit 34 and D2 unit 35 and 16 32-bit registers forming register file B 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from program memory 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Level two unified cache 130 includes a controller that bridges central processing unit 110 and level one instruction cache 121 and level one data cache 123 to level two unified cache 130 and to direct memory access (DMA) unit 150 for communication beyond the local memory subsystem. The L2 controller manages all memory accesses and is responsible for the parity generation and the error detection and reporting to central processing unit 110.

Digital signal processor 100 of this example has 1 MB of level two unified cache 130. This is logically partitioned into 32 32-bit by 8K banks. Though this provides a logical memory width of 512 bits, the maximum access width is 256 bits or 32 bytes. This memory system includes a parity bit for every 32 bytes of memory and a valid bit to qualify each parity bit. Level two unified cache 130 thus requires two parity bits and two valid bits per line. Because the memory of this example has 16 K such lines, this technique requires 2×2×16 K bits. Although the logical requirement is for a parity memory of two banks of 2 by 16 K random access memory (RAM), the physical implementation may differ. The physical implementation preferably consists of two banks of 32 by 1 K RAM with the appropriate control logic.

Figure 3:
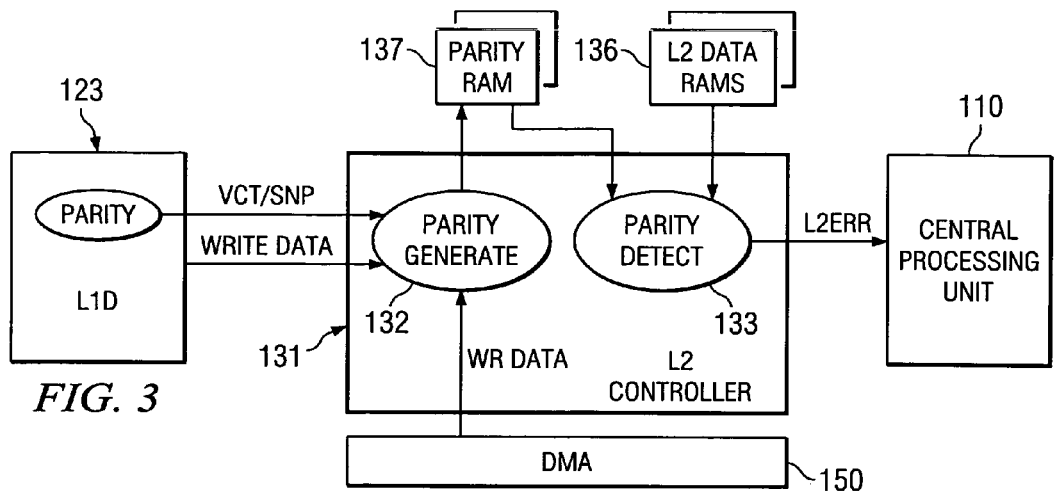
FIG. 3 illustrates a closer view of the relevant portion of the L2 controller within level two unified cache illustrated in FIG. 1.

FIG. 3 illustrates a closer view of the relevant portion of the L2 controller 131 within level two unified cache 130. The L2 controller 131 generates write data to the L2 RAM 136 based on data arriving from the direct memory access (DMA) unit 150 and from the level one data cache 123. Central processing unit 110 accesses go through the L1D controller which is a part of level one data cache 123. Error detection is performed only on data fetched by the central processing unit 110.

Data from level one data cache 123 and from direct memory access (DMA) unit 150 pass through parity generator 132. Parity generator 132 generated parity data on writes to L2 data RAMs 136. Parity detector 133 calculates new parity for data recalled from L2 RAMs 136. Parity detector 133 compares this newly calculated parity with the corresponding parity data recalled from parity RAMs 137. Parity detect 132 generates an L2ERR signal to central processing unit 110 upon detection of a mismatch between the newly calculated parity and the corresponding recalled parity. Exact details of the parity generation and error detection schemes are not relevant to this invention and are not explained further.

The interface of the L2 memory controller 131 to the parity RAMs 137 must contain the following:

1. an Address identifies the line corresponding to the accessed L2line;
2. 2 Bit write enables select the appropriate parity and valid bits;
3. a Read_Write signal identifies the access type;
4. a Bank enable selects between banks;
5. Write Data including parity and valid bits; and
6. Read Data including parity and valid bits.

The interface between L2 memory controller 131 and the L1D controller of level one data cache 123 must include a parity bit with LID to L2 snoop, victim data and write data.

The interface between L2 memory controller 131 and the L1I controller of the level one instruction cache 121 needs no additional bits.

The interface between L2 memory controller 131 and central processing unit 110 must include an Exception/Interrupt (L2ERR) to signal parity mismatch.

The error detection is only intended to protect against data and program being accessed by central processing unit 110. This parity technique only checks for errors on L2 accesses of 256 bits. Any reads for less than 256 bits will not be checked for parity errors. This restricts the error detection to those accesses made to L2 controller 131 from the level one controllers. Direct memory access (DMA) unit 150 accesses will not be checked.

Figure 4:
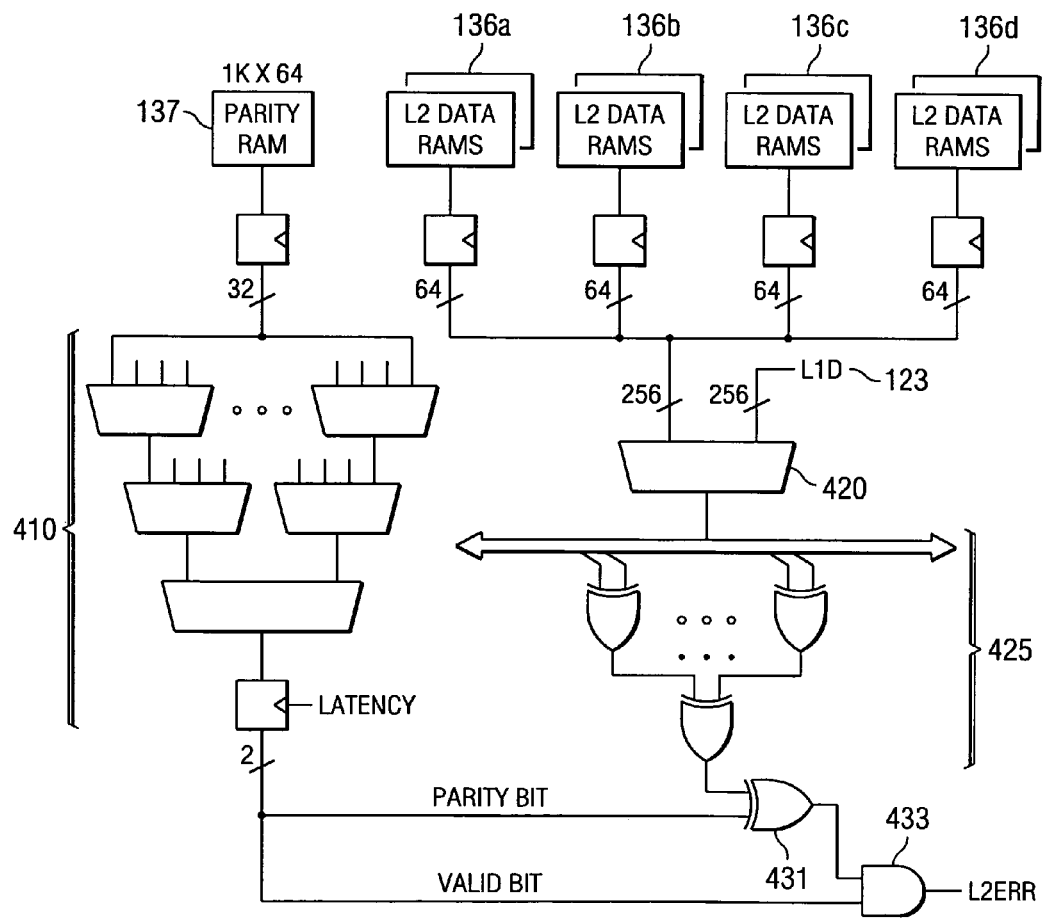
FIG. 4 illustrates the parity detection logic of one embodiment of this invention.

FIG. 4 illustrates parity detection logic 133. On each read of 256 bits from the four banks of L2 data RAMs 136a, 136b, 136c and 136d the corresponding parity bit will also be read. Parity data and a corresponding valid bit are read from parity RAM 137. The address specifies a 32-bit data word within parity RAM 137. A set of multiplexers 410 selects the parity bit and the valid bit corresponding to the line within L2 data RAMs 136 selected by the address. A tree of XOR gates 425 forms the parity from the 256 bits recalled from the four banks of L2 data RAMs 136a, 136b, 136c and 136d. The recalled parity bit from multiplexers 410 and the newly calculated parity from XOR tree 425 form the inputs to XOR gate 431. XOR gate 431 determines if these match or do not match. The output of XOR gate 431 is one input to AND gate 433. The valid bit from parity RAM 137 is the second input to AND gate 433.

XOR gate 431 outputs a 0 if the new and the recalled parity match. It outputs a 1 if they do not match. The valid bit qualifies the parity match via AND gate 433. If the parity is not valid, then the result of the check is ignored. If the parity is valid, then the output of the parity check determines whether the error signal L2ERR is supplied to central processing unit 110.

The parity bit must be written for every L2 write to provide the information required to check the data for errors on reads. This includes all writes made due to central processing unit writes, direct memory access (DMA) unit writes and L1D victims/snoops.

Figure 5:
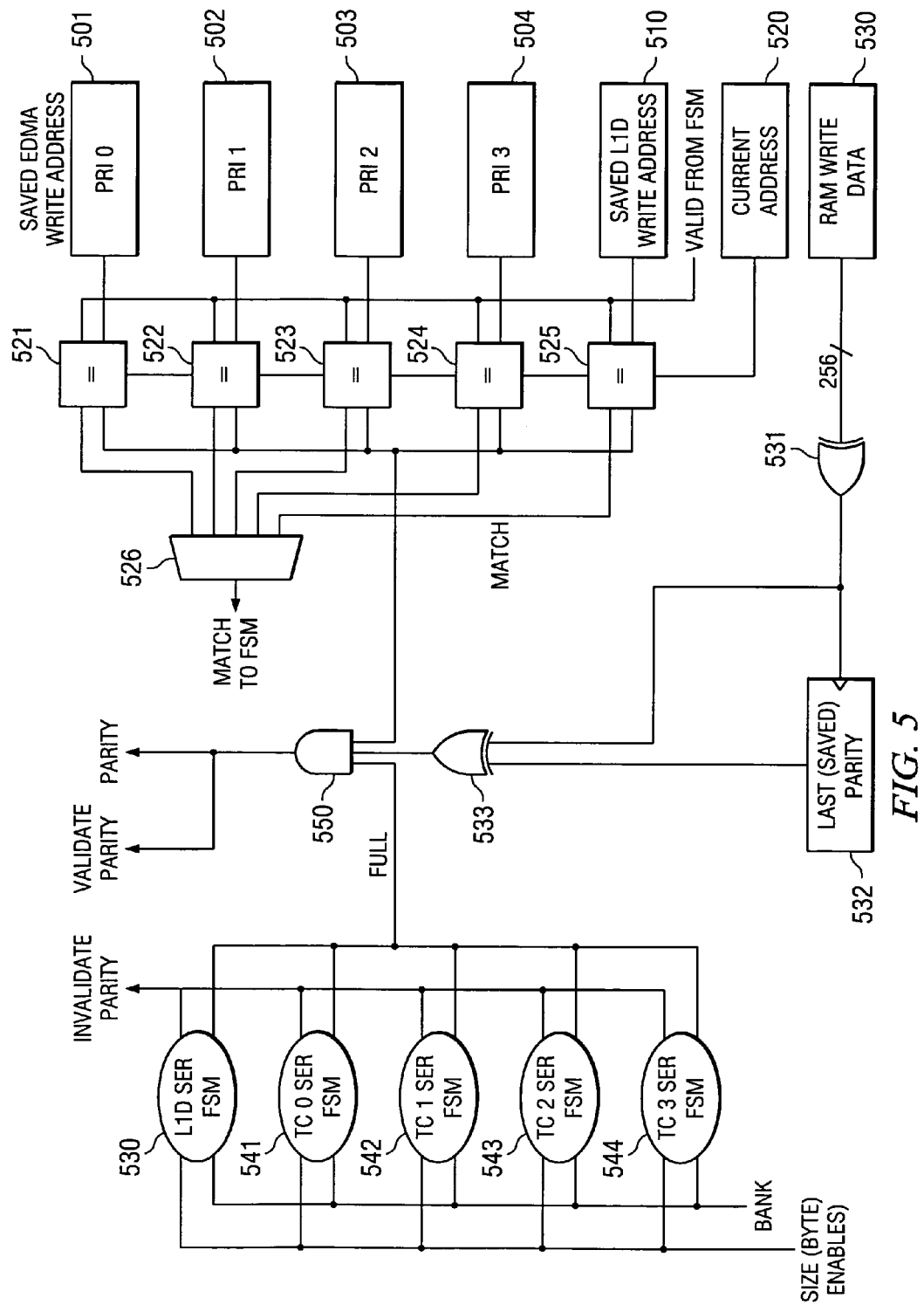
FIG. 5 illustrates the parity generation of one embodiment of this invention.

FIG. 5 illustrates the implementation of the parity generation. The L2 memory writes fall into one of three cases: (1) writing 256 bits from level one data cache 123 for victim evictions, snoops, etc.; (2) writing 256 bits from the read buffer for cache line fills from external memory 161; and (3) writing less than 256 bits via central processing unit 110 writes and direct memory access (DMA) unit 150 writes.

The first case is straightforward. The amount of data written to L2 data RAMs 136 matches the amount of data corresponding to a single parity bit. On this type of write access, the parity bit is generated by the L1D controller within level one data cache 123 and sent along with the data to L2 memory controller as illustrated in FIG. 3. The parity bit is written to parity RAM 137 with the valid bit set to 1 at the same time that the data is written to L2 data RAMs 136.

The second case is similar to the first. Upon a cache fill, the data coming back from external memory is collected into a group of 256 bits which is then written to L2 data RAMs 136. The parity bit is computed after the entire data has been collected. This parity bit is written to parity RAM 137 along with the valid bit set to valid.

The third case is more complicated. The value of the parity bit depends upon both the data being written and the prior contents of L2 data RAMs 136. Since the parity bits are generated for 256 bits of data, the only way to maintain the appropriate parity bit is by a read-modify-write operation. Although this approach is logically correct for all central processing unit 110 and direct memory access (DMA) unit 150 writes, theses accesses often are made to a block of contiguous memory. In such a case all 256 bits of a cache line well be replaced after multiple writes. This behavior can be exploited to simplify the process of generating and saving parity for the most common case of contiguous memory.

Writes to L2 data RAMs 136 will most typically be to contiguous memory. L2 controller 131 store the last DMA/L1D access address in registers 501, 502, 503, 504 and 510 and if the next few writes are for the same 256-bit space then the parity bit can be generated at the end of the writes and written to parity RAM 137 only once.

Every time the L2 memory gets a write from direct memory access (DMA) unit 150 or level one data cache 123, the address is stored in one of the special registers 501, 502, 503, 504 and 510. Since direct memory access (DMA) unit 150 can send writes on four priorities, there is one register for each priority (501, 502, 503 and 504) in addition to a register for L1D writes (510). These registers store the 16-bit address going to the L2 data RAMs 136 and an additional bit for the current parity. When the DMA/L1D sends a write to level two unified cache 130, the address is stored in one of these registers. The parity bit for this data is generated and stored at the same time. This initial write also clears the corresponding byte counter 530 for an L1D write, and byte counter 541, 542, 543 and 544 for the corresponding DMA priorities.

When the next write comes in, the current address stored in current address register 520 is compared against the earlier stored addresses in registers 501, 502, 503, 504 and 510 via respective comparators 521, 522, 523, 524 and 525. This comparison is not on the complete address but only determines if the current address falls within the same cache line in level two unified cache 130 as the stored address. The comparison is conditioned by a valid signal from the corresponding byte counter 530, 541, 542, 543 or 544. The corresponding byte counter 530, 541, 542, 543 and 544 keeps track of the bytes to which the data is being written. For the first write to a 256-bit space, the corresponding byte counter is set to zero and on subsequent writes the counter is incremented by the number of bytes that have been written. This number of bytes is determined by a SIZE input or by counting the number of BYTE ENABLE signals for the memory write.

On the first write to an address space none of the byte counters 530, 541, 542, 543 or 544 is full. The MATCH signal from multiplexer 526 causes the corresponding byte counter 530, 541, 542, 543 or 544 to reset. The calculated parity is written to the parity RAM with a valid bit of 0 via an INVALIDATE PARITY signal. This indicates that the parity in the RAM is not sufficient for the entire RAM space contents. The RAM write data is temporarily stored in register 530. XOR tree 531 forms the parity. This parity is supplied to XOR gate and stored in last stored parity register 532. For subsequent writes to the same 256-bit space, new parity generated by XOR tree 531 from this data is XORed with the previous parity stored in last stored parity register 532 by XOR 533. The newly calculated parity is also maintained in the last saved parity register 532. This continues until all 256 bits are written as indicated by the corresponding byte counter 530, 541, 542, 543 or 544 being full. The corresponding byte counter generates a FULL signal. AND gate 550 ANDs this FULL signal with the MATCH signal and the final calculated parity from XOR 533. At that time the parity bit is written to the parity RAM, along with a valid bit of 1.

The valid bit in the parity RAM 137 must remain unset for all writes except for the last to ensure that if all 256 bits are not written successively (for a specific DMA priority or for writes from level one data cache 123), then the valid bit remains invalid. Also, the address registers 501, 502, 503, 504 and 510 are reset or invalidated whenever there is a level one data cache 123 read or write to the same 256-bit memory space.

The parity bits are calculated and valid only for certain conditions. Thus there are cases for which valid parity information is not generated. These conditions include:

DMA/L1D writes to only a portion of a 256-bit line; and all bits in the 256-bit line not written successively.

Figure 6:
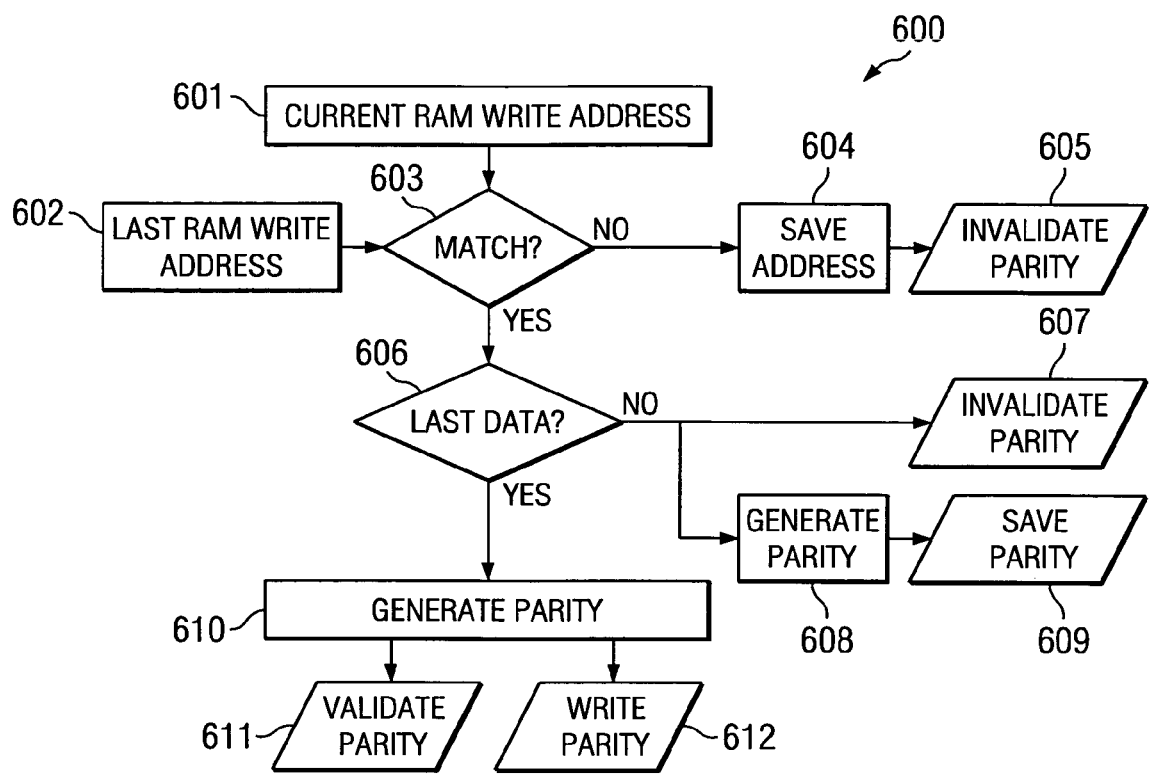
FIG. 6 illustrates a decision flow diagram for marking parity as valid.

FIG. 6 illustrates a decision flow diagram 600 for marking parity as valid. Decision flow 600 starts by comparing the current write address (601) with the last write address (602) in decision block 603. As noted above this comparison only detects whether these two addresses refer to the same cache line and does not require the addresses to be identical. If these addresses do not match (No at decision block 603), then decision flow 600 saves the current address (processing block 604) and invalidates the parity for that cache line (processing block 605).

If the current write address (601) matches the last write address (602) (Yes at decision block 603), then decision flow 600 determines whether this is the last data to fill a cache line (decision block). As previously noted this determination can be via the count of a counter. If this is not the last data for a cache line (No at decision block 606), then decision flow 600 invalidates the parity (processing block 607). This partial write to a cache line means that the previously calculated and stored parity may no longer be correct. Invalidation of the parity for that address insures that incorrect parity information is not considered valid. Decision flow 600 also generates parity for this new data (processing block 608). This new parity generation takes place in XOR tree 531. This newly calculated parity is stored (processing block 609) in last saved parity register 532.

If the current write was the last write to a cache line (Yes at decision block 606), then decision flow 600 generates a new parity (processing block 532). The parity for the current write data calculated by XOR tree 531 is XORed with the last saved parity stored in last saved parity register 532 via XOR gate 533. This parity is now valid for the whole cache line. Thus decision flow 600 validates the parity (processing block 611) and writes this parity (processing block 612) to parity RAM 137.

This decision flow 600 operates to not store an incorrect parity in the case where a series of sequential writes cover more than one cache line. Assume the first write is to a data position near the end of a cache line. Since this is a first write to that particular cache line, there will be not address match (No at decision block 603). Thus the address will be saved (processing block 604) and parity of that cache line will be invalidated (processing block 605). Note that decision flow 600 does not illustrate the data write. The next sequential data write is to the next sequential address, which in this example is the first data of the next cache line. This also does not match (No at decision block 603). So address is saved (processing block 604) and parity of that cache line is invalidated (processing block 605). The next data write to a sequential address then matches a stored address (Yes at decision block 603). In this example, this is not the last data of the cache line (No at decision block 606). So, the already invalid parity is invalidated (processing block 607), the partial parity is generated (processing block 608) and stored (processing block 609). Subsequent sequential data writes take the same path building up the partial parity. Eventually the sequential data write is the last data in a cache line (Yes at decision block 606). This results in generation of the parity of the whole cache line from the new data and the stored partial parity (processing block 610). The new parity is validated (processing block 611) and written to parity RAM 137 (processing block 612). The following sequential memory write is to an address of a new cache line producing no address match (decision block 603). The new address is saved (processing block 604) and parity of that new cache line is invalidated (processing block 605). In this example, the series of sequential writes results in invalidation of the parity of the partially written first and last cache lines. However, the completely written cache line has its parity properly generated, stored and validated. This correct parity of the completely written cache line does not require repeated read-modify-write cycles.

The L2 controller 131 employs three control registers dedicated to the error detection logic. These registers are memory mapped and located along with the other L2 control registers in control registers 13 and are thus accessible by central processing unit 110. These three control registers include: L2 Error Detection Status Register (L2EDSTAT); L2 Error Detection Address Register (L2EDADDR); and L2 Error Detection Command Register (L2EDCMD).

FIG. 7 illustrates the L2 Error Detection Status register (L2EDSTAT) 700. L2 Error Detection Status Register (L2EDSTAT) 700 provides the status of the error detection logic. It contains fields to indicate an L1I access error (IERR) 701, an L1D access (DERR) 702, and the error detection/parity generation logic state (SUSP 703, DIS 704, EN 705). Bits 6 to 31 are reserved. Bit 5 is the IERR bit 701. Bit 4 is the DERR bit 702. Bit 3 is the SUSP bit 703. Bit 2 is tie DIS bit 704. Bit 1 is reserved. Bit 0 is the EN bit 705. Table 1 below shows the codings of these bits of L2 Error Detection Status Register 700.

TABLE 1

| Field | Description |
| --- | --- |
| IERR 701 | IERR = 0: No parity error occurred during L1I access<br>IERR = 1: Parity error occurred during L1I access |
| DERR 702 | DERR = 0: No parity error occurred during L1D access<br>DERR = 1: Parity error occurred during L1D access |
| SUSP 703 | SUSP = 0: Error detection/parity generation logic is not suspended (either enabled or disabled)<br>SUSP = 1: Error detection/parity generation logic is suspended |
| DIS 704 | DIS = 0: Error detection/parity generation logic is not disabled (either suspended or disabled)<br>DIS = 1: Error detection/parity generation is disabled |
| EN 705 | EN = 0: Error detection/parity generation logic is not enabled (either suspended or disabled)<br>EN = 1: Error detection/parity generation is enabled |

When the error detection and parity generation logic is in reset, such as after first enabling the logic, the L2 Error Detection Status register 700 will be reset EN=DIS=SUSP=0. Only when the logic is fully enabled following reset does EN=1.

FIG. 8 illustrates the L2 Error Detection Address Register (L2EDADDR) 800. L2 Error Detection Address Register (L2EDADDR) 800 provides the address information for a detected error. It contains fields to indicate the address (ADDR) 801, the way of cache within the L2 memory (L2WAY) 802, the portion of the L2 line (QLINE) 803 and whether the error was encountered in an L2 cache or SRAM section (SRAM) 804. Bits 5 to 31 are the address field 801 indicating most significant address bits of the address generating the error. Bits 3 and 4 are the L2 WAY bits 802 indicating the cache way having the data error. Bits 1 and 2 are the OLINE bits 803 indicating the location of the error by quarters of the cache line. Bit 0 is the SRAM bit 804 indicating whether the error was detected in memory allocated to directly addressable memory or to combined level two cache. Table 2 shows the codings of these bits of the L2 Error Detection Address register 800.

TABLE 2

| Field | Description |
| --- | --- |
| ADDR 801 | Address of parity error with 5 LSBs assumed to be "00000" |
| L2WAY 802 | L2WAY = 00: Error detected in WAY 0 of L2 cache<br>L2WAY = 01: Error detected in WAY 1 of L2 cache<br>L2WAY = 10: Error detected in WAY 2 of L2 cache<br>L2WAY = 11: Error detected in WAY 3 of L2 cache |
| QLINE 803 | QLINE = 00: Error detected in first quarter L2 cache/SRAM line<br>QLINE = 01: Error detected in second quarter L2 cache/SRAM line<br>QLINE = 10: Error detected in third quarter L2 cache/SRAM line<br>QLINE = 11: Error detected in fourth quarter L2 cache/SRAM line |
| SRAM 804 | SRAM = 0: Error detected in L2 cache<br>SRAM = 1: Error detection/parity generation is enabled |

FIG. 9 illustrates the coding of the L2 Error Detection Command register (L2EDCMD) 900. The L2 Error Detection Command Register (L2EDCMD) 900 facilitates clearing the error reported in the L2EDSTAT register 700 and allows the error detection and parity generation logic to be enabled, disabled, or suspended. Bits 6 to 31 are reserved. Bit 5 is the ICLR bit 901. Bit 4 is the DCLR bit 902. Bit 3 is the SUSP bit 903. Bits 1 and 2 are reserved. Bit 0 in the EN bit 904. The coding of these bits is shown in Table 3.

TABLE 3

| Field | Description |
| --- | --- |
| ICLR 901 | ICLR = 0 No effect<br>ICLR = 1 L1I parity error bit cleared and ADDRESS reset in L2EDSTAT |
| DCLR 902 | DCLR = 0 No effect<br>DCLR = 1 L1D parity error bit cleared and ADDRESS reset in L2EDSTAT |
| SUSP 903 | SUSP = 0 Normal operation<br>SUSP = 1 Suspend error detection/parity generation logic (EN must be 1) |
| EN 904 | EN = 0: Error detection/parity generation logic is not enabled (either suspended or disabled)<br>EN = 1: Error detection/parity generation is enabled |

When the error detection logic is disabled (L2EDCMD field EN 904 is 0), then L2 controller 131 does not check for errors. All reads from level two unified cache 130 from any source do not cause any parity check. Likewise, writes to level two unified cache 130 do not generate new parity information. Enabling the error detection logic (L2EDCMD field EN 904 is 1) when in the disabled state causes the L2 controller 131 to perform a parity reset of parity RAM 137. This sets all valid bits to zero, indicating all parity bits are invalid. During the reset process, read accesses do not result in a parity check and writes to level two unified cache 130 do not generate parity information. The error detection and parity generation logic is not enabled until the reset process has completed.

When the error detection logic is suspended (L2EDCMD SUSP field 903 is 1 and L2EDCMD EN field 904 is 1) L2 controller 131 does not check for errors. All reads from level two unified cache 130 from any source do not cause any parity check. Likewise, writes to level two unified cache 130 do not generate new parity information. Re-enabling the error detection logic (L2EDCMD SUSP field 903 is 0) when returning from the suspend mode does not reset parity RAM 137, but does re-enable the error detection logic. This means that all parity and valid bits in parity RAM 137 retain their pre-suspend values. Any data that was changed while the logic was suspended may not match the corresponding parity and an error could be generated when the location is read.

Writing a 1 to the L2EDCMD EN bit 904 only resets parity RAM 137 when forcing a transition from the disabled to enabled state. This resets the parities when already enabled. So the error detection/parity Logic must first be disabled, then re-enabled.

When an error is found on a central processing unit 110 fetch from level two unified cache 130, L2 controller 131 stores the relevant information in the status registers defined above. L2 controller 131 sends an error event (L2ERR) to central processing unit 110. This exception event is multiplexed with the non-maskable interrupt (NMI) to central processing unit 110 and notifies central processing unit 110 immediately that an exception has occurred.

There are several cases for which the parity bit may be incorrect, but marked as valid.

There may be a soft error in parity RAM 137 and the parity bit got flipped. In this case an actual error in the L2 data RAMs 136 could get masked because of an incorrect parity bit. Thus two soft-errors, one in L2 data RAMs 136 and one in parity RAM 137, causes an erroneous parity flag. The odds of multiple soft errors occurring at the same time and on the same 256-bit cache line are very low.

There may be a soft error in parity RAM 137 and the valid bit got flipped. One possibility is for a valid to be flipped to invalid. In this case the parity would not be checked on a read, which would only cause a problem if a soft error occurred in L2 data RAMs 136 for the same address as well. As noted above, this would be a rare occurrence. The other possibility would be for an invalid to be flipped to valid. In this case, an incorrect error would potentially be signaled to central processing unit 110 as the parity bit would have no true correspondence to the data.

Soft RAM errors can occur after the parity is calculated and stored either through L2 data RAMs 136 writes or a parity_recompute. In this case an error will not be signaled to central processing unit 110 when it exists.

Figure 10:
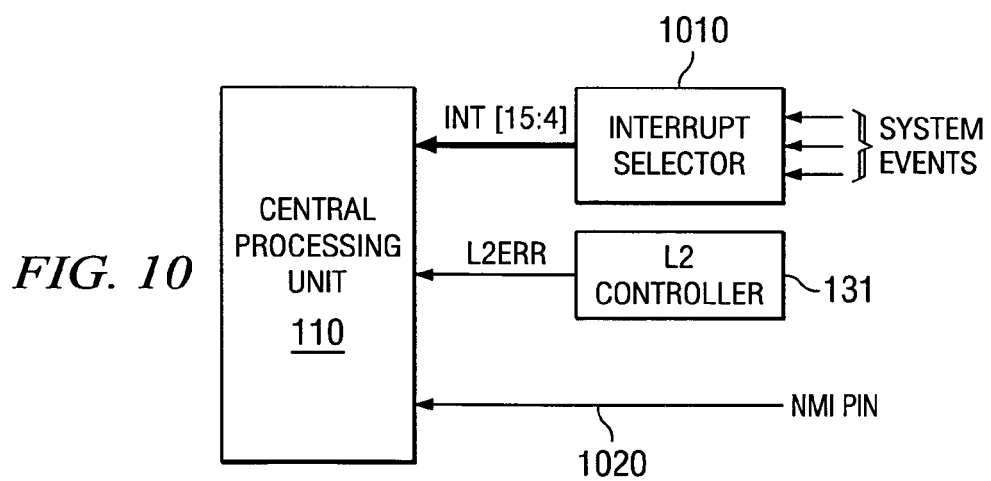
FIG. 10 is a block diagram illustrating interrupt event routing.

FIG. 10 is a block diagram illustrating interrupt event routing. System events to central processing unit 110 arrive from interrupt selector 1010. Interrupt selector 1010 selects system events to act as central processing unit 110 interrupts. Central processing unit 110 responds to the L2ERR signal generated by L2 controller 131. Central processing unit 110 also responds to a non-maskable interrupt (NMI) device pin 1020.

Figure 11:
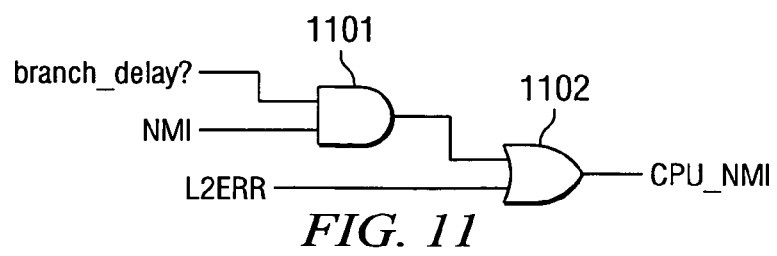
FIG. 11 illustrates how the parity error signal is combined with the non-maskable interrupt input within the central processing unit.

FIG. 11 illustrates how the L2ERR event gets combined with the NMI input within central processing unit 110. The non-maskable interrupt (NMI) and all other central processing unit 110 interrupts are gated by the branch_delay status of central processing unit 110. AND gate 1101 receives both the branch_delay signal and the non-maskable interrupt (NMI) signal. Thus central processing unit 110 cannot be interrupted while executing a branch instruction. Conversely, central processing unit 110 receives a CPU_NMI interrupt from OR gate 1102 immediately when the L2ERR signal is asserted. This allows central processing unit 110 to be notified of the memory error ever during tight code loops.

When the CPU_NMI interrupt is received by central processing unit 110, central processing unit 110 polls the L2 error Detection status registers (L2EDSTAT and L2EDADDR) to determine the cause of the event. L2EDSTAT IERR field 701 and DERR field 702 notify central processing unit 110 whether the error occurred during a program or data fetch, respectively. L2 Error Detection Address Register (L2EDADDR) 800 contains information on the exact L2 data RAMs 136 location of the fault in ADDR field 801. The SRAM field 804 indicates whether the failure is in an SRAM or a cache location. The L2WAY field 902 indicates the cache if the error was in memory selected as cache way. In this example, level two unified cache 130 is a four-way set-associative cache.

Based on the failure location and whether the fetch was for data or instruction, central processing unit 110 can determine the next course of action. Options include: performing software error detection and correction to fix the error if program or static data is the cause; terminating the task if data is corrupted; and rebooting all or some of the system if no software correction is available for the data location.

The error detection and reporting logic within L2 controller 131 greatly reduces the effects of soft errors in a real-time digital signal processing system. Errors within L2 data RAMs 136 are flagged and recorded when fetched by central processing unit 130. This allows central processing unit 130 to take corrective action to prevent a system failure.

The proximity of control registers 13 to central processing unit 110 allows a quick determination of which option is taken. This flexibility allows for robustness against soft-errors within a real-time digital signal processing system.

What is claimed is:

1. A parity memory system comprising:
 a memory array having a plurality of memory lines of a predetermined data length;
 a parity memory storing at least one parity bit corresponding to each memory line of said memory and a corresponding valid bit;
 a parity error detection logic connected to said memory array and said parity memory including
  a parity generator generating at least one parity bit upon a read access of an entire memory line of said memory array,
  a comparator receiving said at least one parity bit corresponding to a read access of an entire memory line and said at least one parity bit generated by said parity generator, said comparator generating a parity error signal if said at least one parity bit corresponding to a read access of an entire memory line fails to match said at least one parity bit generated by said parity generator; and
 a parity generator receiving data to be written into said memory array, said parity generator operable to
  calculate parity from data to be written, store said calculated parity in said parity memory and set said corresponding valid bit to indicate valid upon a write access to an entire memory line of said memory array, and
  set said corresponding valid bit to indicate invalid upon a write access to less than an entire memory line of said memory array.

2. The memory system of claim 1, wherein:
 said parity generator is further operative to
  accumulate parity upon each write access to less than an entire memory line of said memory array, and
  store said accumulated parity to said parity memory and set said corresponding valid bit to indicate valid upon a series of write accesses that encompass an entire memory line of said memory array.

3. The method of claim 2, further comprising the steps of:
 accumulating parity upon each write access to less than an entire memory line of said memory array; and
 storing said accumulated parity to said parity memory and setting said corresponding valid bit to indicate valid upon a series of write accesses that encompass an entire memory line of said memory array.

4. The memory system of claim 1, further comprising:
 at least one control register; and
 wherein said parity error detection logic is further operable to store in said at least one control register data indicative of status of said memory system upon generation of said parity error signal.

5. The memory system of claim 4, wherein:
 said data indicative of status of said memory system includes an address of a read access causing said parity error signal.

6. The memory system of claim 4, further comprising:
 a level one instruction cache temporarily storing instructions accessed by a central processing unit;
 a level one data cache temporarily storing data accessed by the central processing unit;
 wherein said memory array consists of a level two unified cache temporarily storing data stored in said level one instruction cache and data stored in said level one data cache; and
 wherein said data indicative of status of said memory system includes an indication of whether a read access for a level one instruction cache fill or for a level one data cache fill caused said parity error signal.

7. The memory system of claim 4, wherein:
 said memory array consists of a cache temporarily storing instructions and data accessed by a central processing unit, said cache consisting of a plurality of cache ways; and
 said data indicative of status of said memory system includes an indication of a one of said plurality of cache ways accessed by read access causing said parity error signal.

8. The memory system of claim 4, wherein:
 each memory line of said memory array is divided into a plurality of parts; and
 said data indicative of status of said memory system includes an indication of a one of said plurality of memory line parts accessed by read access causing said parity error signal.

9. The memory system of claim 4, wherein:
 said memory array is selectively configurable as cache memory temporarily storing instructions and data accessed by a central processing unit and directly addressable memory; and
 said data indicative of status of said memory system includes an indication of whether a cache access or a directly addressable memory access caused said parity error signal.

10. A data processing method comprising the steps of:
 storing data in a memory array having a plurality of memory lines of a predetermined data length;
 storing at least one parity bit corresponding to each memory line of said memory and a corresponding valid bit;
 generating at least one parity bit upon a read access of an entire memory line of said memory array;
 generating a parity error signal if said at least one parity bit corresponding to a read access of an entire memory line fails to match said generated at least one parity bit;

calculating parity from data to be written, storing said calculated parity in said parity memory and setting said corresponding valid bit to indicate valid upon a write access to an entire memory line of said memory array; and setting said corresponding valid bit to indicate invalid upon a write access to less than an entire memory line of said memory array.

11. The method of claim 10, further comprising the step of:

storing data indicative of status of said memory system upon generation of said parity error signal.

12. The method of claim 11, wherein:

said step of storing data indicative of status of said memory system stores an address of a read access causing said parity error signal.

13. The method of claim 11, wherein said memory array consists of a level two unified cache temporarily storing data stored in a level one instruction cache and data stored in a level one data cache, said method wherein;

said step of storing data indicative of status of said memory system stores an indication of whether a read access for a level one instruction cache fill or for a level one data cache fill caused said parity error signal.

14. The method of claim 11, wherein said memory array consists of a cache temporarily storing instructions and instructions accessed by a central processing unit, said cache consisting of a plurality of cache ways, said method wherein:

said step of storing data indicative of status of said memory system stores an indication of a one of said plurality of cache ways accessed by read access causing said parity error signal.

15. The method of claim 11, wherein each memory line of said memory array is divided into a plurality of parts, said method wherein:

said step of storing data indicative of status of said memory system stores an indication of a one of said plurality of memory line carts accessed by read access causing said parity error signal.

16. The method of claim 11, wherein said memory array is selectively configurable as cache memory temporarily storing instructions and data accessed by a central processing unit and directly addressable memory, said method wherein:

said step of storing data indicative of status of said memory system stores an indication of whether a cache access or a directly addressable memory access caused said parity error signal.

* * * * *